US011926715B2

(12) United States Patent
Gaedt et al.

(10) Patent No.: US 11,926,715 B2
(45) Date of Patent: Mar. 12, 2024

(54) SPRAY DRYING METHOD

(71) Applicant: BASF SE, Ludwigshafen am Rhein (DE)

(72) Inventors: Torben Gaedt, Trostberg (DE); Joachim Dengler, Trostberg (DE); Manfred Bichler, Trostberg (DE)

(73) Assignee: BASF SE, Ludwigshafen am Rhein (DE)

( * ) Notice: Subject to any disclaimer, the term of this patent is extended or adjusted under 35 U.S.C. 154(b) by 990 days.

(21) Appl. No.: 16/759,339

(22) PCT Filed: Oct. 24, 2018

(86) PCT No.: PCT/EP2018/079092
§ 371 (c)(1),
(2) Date: Apr. 26, 2020

(87) PCT Pub. No.: WO2019/081548
PCT Pub. Date: May 2, 2019

(65) Prior Publication Data
US 2020/0283584 A1 Sep. 10, 2020

(30) Foreign Application Priority Data
Oct. 27, 2017 (EP) .................................... 17198744

(51) Int. Cl.
| | | |
|---|---|---|
| *C08J 3/12* | (2006.01) | |
| *C04B 24/38* | (2006.01) | |
| *C04B 28/02* | (2006.01) | |
| *C04B 28/14* | (2006.01) | |
| *C04B 103/00* | (2006.01) | |

(52) U.S. Cl.
CPC ............ *C08J 3/122* (2013.01); *C04B 24/383* (2013.01); *C04B 28/02* (2013.01); *C04B 28/14* (2013.01); *C04B 2103/0057* (2013.01); *C04B 2103/0082* (2013.01); *C08J 2300/12* (2013.01); *C08J 2301/28* (2013.01); *C08J 2303/08* (2013.01); *C08J 2305/00* (2013.01); *C08J 2433/08* (2013.01); *C08J 2433/26* (2013.01); *C08J 2471/00* (2013.01)

(58) Field of Classification Search
CPC ....... C04B 24/383; C04B 28/02; C04B 28/14; C04B 2103/0057; C04B 2103/0082; C04B 40/0042; C08J 3/122; C08J 2300/12; C08J 2301/28; C08J 2303/08; C08J 2305/00; C08J 2433/08; C08J 2433/26; C08J 2471/00; C08J 2301/26; C08J 2400/12; C08J 2401/26; C08J 2401/28; C08J 2405/00; C08J 2403/08; Y02W 30/91
See application file for complete search history.

(56) References Cited

U.S. PATENT DOCUMENTS

| | | | |
|---|---|---|---|
| 7,910,640 B2 | 3/2011 | Wieland et al. | |
| 9,802,864 B2 | 10/2017 | Hesse et al. | |
| 2015/0344368 A1* | 12/2015 | Hesse ................. | C04B 40/0042 524/5 |

FOREIGN PATENT DOCUMENTS

| | | |
|---|---|---|
| EP | 2695866 A2 | 2/2014 |
| WO | WO-2006042709 A1 | 4/2006 |
| WO | WO-2010026155 A1 | 3/2010 |
| WO | WO-2014114784 A1 | 7/2014 |
| WO | WO-2015091461 A1 | 6/2015 |
| WO | WO-2016169981 A1 | 10/2016 |

OTHER PUBLICATIONS

U.S. Appl. No. 16/324,201, Dengler et al.
European Search Report for EP17198744.9 dated Apr. 30, 2018.
International Search Report for PCT/EP2018/079092 dated Jan. 31, 2019.
Written Opinion of the International Searching Authority for PCT/EP2018/079092 dated Jan. 31, 2019.

* cited by examiner

*Primary Examiner* — Anthony J Green
(74) *Attorney, Agent, or Firm* — Faegre Drinker Biddle & Reath LLP

(57) ABSTRACT

The invention relates to a process for producing a pulverulent composition comprising at least one polymeric dispersant (PD) which comprises structural units having anionic and/or anionogenic groups and structural units having polyether side chains, and at least one polysaccharide (PS). The process here comprises the process steps: a) production of an aqueous dispersion having a viscosity of the dispersion of less than 10 000 mPa·s, comprising the at least one polymeric dispersant (PD) and the at least one polysaccharide (PS) and b) spray drying of the aqueous dispersion produced in process step a). Furthermore, the use of the pulverulent composition according to the invention in inorganic binder compositions, especially as a rheological additive, is disclosed.

16 Claims, No Drawings

SPRAY DRYING METHOD

CROSS-REFERENCE TO RELATED APPLICATIONS

This application is a national stage application (under 35 U.S.C. § 371) of PCT/EP2018/079092, filed Oct. 24, 2018, which claims benefit of European Application No. 17198744.9, filed Oct. 27, 2017, both of which are incorporated herein by reference in their entirety.

The present invention relates to a process for producing a pulverulent composition comprising at least one polymeric dispersant (PD) which comprises structural units having anionic and/or anionogenic groups and structural units having polyether side chains, and at least one polysaccharide (PS). Furthermore, a pulverulent composition obtained from the process and the use of the pulverulent composition as a rheological additive.

"R. Bayer, H. Lutz, *Dry Mortars, Ullmann's Encyclopedia of Industrial Chemistry* 6th ed., vol. 11, Wiley-VCH, Weinheim, (2003), 83-108" gives an overview of the applications and composition of dry mortars, such as binders, aggregates and various additions. In particular, polymer-modified cementitious dry mixtures are obtainable by means of additions (often also called admixtures) such as redispersible polymer powders, plasticizers and/or cellulose ethers. The dry mortar mixtures are distinguished by the fact that a tailored adaptation to different application profiles can be established by means of the selection of the additions, while at the construction site all that remains to be done is to add water to the finished dry mortar mixture in a simple and safe manner.

Important additions include polysaccharides, which in addition to water retention also predominantly serve to adjust rheological properties of the corresponding building material mixtures, for example viscosity and/or thixotropy. By way of example, thixotropic properties are necessary in tile adhesive mortars for improving the slip resistance while at the same time allowing the position of the tiles to be easily corrected. Preference is given, for example, to cellulose ethers, nonionic starch ethers or microbiologically produced polysaccharides.

As a further admixture, dispersants play a significant role in dry mortar mixtures. It is known that aqueous slurries of pulverulent inorganic or organic substances, such as clays, silicate flour, chalk, carbon black, rock flour and hydraulic binders, are often admixed with admixtures in the form of dispersants in order to improve their processibility, that is to say kneadability, spreadability, sprayability, pumpability or flowability. Such admixtures are capable of breaking up agglomerates of solids, of dispersing the particles formed and of in this way improving the processibility. This effect is also utilized in a specific manner particularly in the production of building material mixtures which comprise hydraulic binders, such as cement or hydraulic lime, or latent hydraulic binders such as fly ash, blast furnace slag or pozzolans. These dispersants are also used for binder systems based on calcium sulfate, such as hemihydrate or anhydrite.

In order to bring these building material mixtures, based on the stated binders, into a ready-to-use, processible form, it is generally necessary to use substantially more mixing water than would be needed for the subsequent hydration/hardening process. The cavity content in the concrete body which is formed as a result of the excess water, which evaporates at a later stage, results in a significant deterioration in mechanical strengths and stabilities.

In order to reduce this excess water fraction for a given processing consistency, and/or to improve the processibility for a given water/binder ratio, admixtures are used which are identified generally as water reducers or plasticizers. Agents of this kind used in industry are especially copolymers which for example are prepared by free-radical copolymerization of acid monomers with polyether macromonomers or by polycondensation of aromatic monomers comprising polyethers and anionic groups.

It is also known that mixtures of pulverulent substances have a tendency toward segregation, in particular when the relative density, the particle size and/or the surface properties are different. This problem arises relatively frequently in particular in the case of free-flowing (flowable) powders. This can lead to an inhomogeneous distribution of the admixtures in the dry mortar, which can lead to unacceptably varying properties of samples from the same dry mortar bag, but also as a result of production to differing quality of different batches in the production process. For example, an excess of dispersant would lead to a "bleeding" of the building material mixture which has been freshly mixed with water, combined with segregation of the aggregates, the binder cement and the mixing water. An excess of an admixture that increases the viscosity, such as for example cellulose ether, would in turn lead to a disproportionately intense thickening of the building material mixture and thus to a lack of processibility in the fresh state.

In order to counteract these problems, which are a very great detriment to the quality, in particular the application reliability of a dry mortar mixture, various approaches have been disclosed in the prior art. For example, the packing density of the dry mortar can be correspondingly adjusted in order to generate the smallest possible cavities in the mortar. A disadvantage of this method is that the particle size bands of the mortar have to be matched to one another extremely well, which is possible only with great difficulty, if at all, with the current, often highly fluctuating, raw material quality. The flowability of the powder furthermore also suffers in this way. A further option is to adapt the density of the individual rheology additives to one another with additional salts and to produce the powders with identical particle size distribution. A disadvantage of this method is the high technical complexity thereof (very high optimization complexity), since different drying methods and starting substrates to be dried yield different particle sizes and particle size distributions in a manner that is hardly predictable.

A further problem in the prior art is that rheology additives based on polysaccharides, such as for example cellulose ether, can be converted into powder form only in a relatively complicated manner. In general, this is done by means of roll drying and subsequent grinding of the rather coarse-grained dry matter obtained. These materials are often scale-like in form and angular which likewise has a negative effect on the flowability of the powder products.

The aim of this invention was to specify a process which, in a simple, reliable and effective manner, allows avoidance of the abovedescribed disadvantages of the prior art and provision of largely separation-proof dry mortar mixtures of high quality (in particular free-flowing powders with high flowability). In addition, it was an object of the invention to make available a cost-effective, simple and effective process which allows industrial-scale preparation of pulverulent compositions comprising at least polysaccharides in a process with a high space-time yield. In particular, grinding steps should be avoided as far as possible here, since these are time-consuming and relatively expensive.

This objective is achieved by a process for producing a pulverulent composition comprising at least one polymeric dispersant (PD) which comprises at least one structural unit comprising anionic groups and/or at least one structural unit comprising anionogenic groups and also at least one structural unit having polyether side chains, and at least one polysaccharide (PS), wherein the weight ratio of polymeric dispersant (PD) to polysaccharide (PS) is from 1/1 to 50/1 and the following process steps are performed:
  a) production of an aqueous dispersion having a viscosity of the dispersion of less than 10 000 mPa·s, comprising the at least one polymeric dispersant (PD) and the at least one polysaccharide (PS),
  b) spray drying of the aqueous dispersion produced in process step a).

The object is also achieved by a pulverulent composition obtained from the process according to the invention and by a building material composition comprising the pulverulent compositions according to the invention and at least one inorganic binder. The object is likewise achieved by the use of the pulverulent compositions according to the invention as a rheological additive for building material mixtures comprising cement, calcium sulfate hemihydrate, anhydrite, slag sand, fly ash, silica dust, metakaolin, natural pozzolans, burnt oil shale, calcium aluminate cement or calcium sulfoaluminate cement, and also by the use for the production of dry mortar mixtures in order to prevent separation of the polymeric dispersant (PD) and of the polysaccharide (PS) in the dry mortar.

The inventive pulverulent compositions obtained from the process comprise at least one polymeric dispersant (PD) which comprises at least one structural unit comprising anionic groups and/or at least one structural unit comprising anionogenic groups and also at least one structural unit having polyether side chains. The anionic groups are not particularly limited, but preferably comprise carboxylate groups, phosphonate groups and phosphate groups. Examples of possible anionic groups are also sulfonate groups and sulfate groups, but these are less preferred.

The term "anionogenic groups" is preferably understood to mean chemical groups which by way of a chemical reaction, preferably by way of a hydrolysis reaction and/or an acid/base reaction, can release an anionic group, preferably carboxylates, phosphonates or phosphates can be released, especially preferably carboxylates. This can be effected, for example, by way of a hydrolysis reaction of corresponding esters of carboxylic acids, phosphonic acids or phosphoric acid, likewise by way of a hydrolysis reaction of corresponding acid anhydrides, for example maleic anhydride in copolymerized form. In the simplest case, an anionogenic group is understood to be a protonated acid function, such as for example a carboxylic acid (COOH), which depending on the pH of the aqueous system (in particular in the case of an increase in the pH) can be converted to the anionic group.

The polymeric dispersant (PD) also comprises polyether side chains, the polyether side chains are preferably poly (alkylene glycol) or comprise poly(alkylene glycol). The poly(alkylene glycol) especially preferably comprises more than 60 mol %, especially preferably more than 80 mol % of poly(ethylene glycol), based on the poly(alkylene glycol). The dispersants (PD) are in particular used as water reducers for increasing the strengths of hydraulic building material mixtures while having an identical or improved processibility, and for increasing the durability of constructions made from hydraulic binders. The dispersants especially find use in cementitious building material mixtures, such as for example mortar and concrete. The polymeric dispersants (PD) surprisingly reduce the viscosity of dispersions of polysaccharides and thus make efficient spray drying possible. Further details regarding the dispersants (PD) can be found in the following text and in the claims.

The polysaccharides (PS) in the inventive composition serve to adjust the rheological properties of the corresponding building material mixtures, for example the viscosity and the thixotropy in the fresh state. They also serve as water retention agents in order to prevent water which is required for setting from being prematurely withdrawn from the hydraulic binder by means of for example absorbent substrates or bases. The polysaccharides are preferably water-soluble, the water solubility is preferably greater than 1 g/l, especially preferably greater than 5 g/l. The water solubility is especially preferably from 10 g/l to 20 g/l.

The water solubilities specified above are determined in distilled water at 20° C. and standard pressure.

Preferred polysaccharides (PS) are cellulose ethers, for example alkyl celluloses such as methyl cellulose, ethyl cellulose, propyl cellulose and methyl ethyl cellulose, hydroxyalkyl celluloses such as hydroxyethyl cellulose (HEC), hydroxypropyl cellulose (HPC) and hydroxyethyl hydroxypropyl cellulose, alkyl hydroxyalkyl celluloses such as methyl hydroxyethyl cellulose (MHEC), methyl hydroxypropyl cellulose (MHPC) and propyl hydroxypropyl cellulose. Preference is given to the cellulose ether derivatives methyl cellulose (MC), hydroxypropyl cellulose (HPC), hydroxyethyl cellulose (HEC) and ethyl hydroxyethyl cellulose (EHEC), particular preference is given to methyl hydroxyethyl cellulose (MHEC) and methyl hydroxypropyl cellulose (MHPC). The abovementioned cellulose ether derivatives, which are each obtainable by appropriate alkylation or alkoxylation of cellulose, are preferably in the form of nonionic structures. Nonionic polysaccharides are preferred over ionic polysaccharides.

In addition, preference is also given to using nonionic starch ether derivatives, such as for example hydroxypropyl starch, hydroxyethyl starch and methyl hydroxypropyl starch. Hydroxypropyl starch is preferred. The starch ether derivatives are present in the dry mixture either alone, but preferably in combination with one or more of the abovementioned cellulose ether derivatives, they are particularly preferably present together with methyl hydroxyethyl cellulose (MHEC) and/or methyl hydroxypropyl cellulose (MHPC).

Preference is given to microbially produced polysaccharides such as welan gum, xanthan gum or diutan gum, it being possible for the respective polysaccharides to be used individually or in mixtures.

It is also possible to use naturally occurring polysaccharides, such as for example alginates, carrageenans and galactomannans. These naturally occurring polysaccharides are preferably of vegetable origin. They can be obtained from appropriate natural products, for example algae or plants, especially plant seeds, by extractive methods. For example from algae in the case of alginates and carrageenans, from carob seeds and also from guar beans in the case of galactomannans. It is also possible to use polysaccharides (PS) which have been obtained from fungus cultures.

One or more of the aforementioned types of polysaccharides, as well as two or more representatives of these types, may be used.

In the hydraulically binding dry mixture, the water retention agents based on polysaccharide structures are present, based on the dry mixture, from 0.01% to 1.5% by weight, preferably from 0.05% to 1.2% by weight, particularly preferably from 0.1% to 1.0% by weight.

The weight ratio of polymeric dispersant (PD) to polysaccharide (PS) is from 1/1 to 50/1, preferably 25/1 to 50/1, particularly preferably from 30/1 to 40/1. The use of little dispersant (PD) compared to the polysaccharide (PS) tends to lead to comparatively higher viscosities of the spray feed obtained, which makes efficient spray drying difficult. On the other hand, the use of little polysaccharide (PS) compared to the dispersant (PD) leads to a relatively low space-time yield with respect to the polysaccharide and consequently to relatively low viscosities in the application, which is a disadvantage in terms of the sedimentation robustness.

In a particularly preferred embodiment, the weight ratio of polymeric dispersant (PD) to polysaccharide (PS) is from 2/1 to 50/1, preferably 3/1 to 50/1, particularly preferably from 9/1 to 40/1, and the pulverulent composition consists to an extent of at least 65% by weight, preferably at least 75% by weight, particularly preferably at least 85% by weight of the polymeric dispersant.

In the process according to the invention, the following steps are performed:
  a) production of an aqueous dispersion having a viscosity of the dispersion of less than 10 000 mPa·s, comprising the at least one polymeric dispersant (PD) and the at least one polysaccharide (PS) and
  b) spray drying of the aqueous dispersion produced in process step a).

The viscosity of the dispersion obtained in step a) is preferably lower than 5000 mPa·s, particularly preferably lower than 2000 mPa·s. A low viscosity facilitates the spray drying process, in particular the situation is avoided where excessively large droplets form in the spray dryer which do not dry out in the fall time of the dryer. An excessively high viscosity makes spraying of the solution more difficult.

The solids content of the dispersion obtained in step a) is preferably greater than 25% by weight, particularly preferably greater than 30% by weight and especially preferably from 35% by weight to 55% by weight.

Spray drying is a method for producing dry powders from liquids or dispersions in a gentle and effective way. Process step b) spray drying of the aqueous dispersion produced in process step a) is preferably effected at an inlet temperature in the range from 120 to 300° C. and an outlet temperature in the range from 60 to 120° C. The drying is effected by means of a drying gas having the aforementioned inlet temperature.

In principle, all conventional spray drying apparatuses are suitable for carrying out the process according to the invention. Suitable spray nozzles are single-fluid nozzles, and also multichannel nozzles such as two-fluid nozzles, three-channel nozzles or four-channel nozzles. Such nozzles may also be designed as what are known as "ultrasound nozzles". Nozzles of this kind are commercially available.

In addition, an atomizing gas can also be supplied, depending on the nozzle type. The atomizing gas used can be air or an inert gas such as nitrogen or argon. The gas pressure of the atomizing gas can preferably be up to 1 MPa absolute, preferably 0.12 to 0.5 MPa absolute.

One embodiment of the invention relates to ultrasound nozzles. Ultrasound nozzles can be operated with or without atomizing gas. In the case of ultrasound nozzles, atomization is effected by setting the phase to be atomized in vibration. Depending on the nozzle size and design, the ultrasound nozzles can be operated at a frequency from 16 to 120 kHz.

The throughput of liquid phase to be sprayed per nozzle depends on the nozzle size. The throughput can be 500 g/h to 1000 kg/h of solution or suspension. When producing commercial quantities, the throughput is preferably in the range from 10 to 1000 kg/h.

When no atomizing gas is used, the liquid pressure can be 0.2 to 40 MPa absolute. If an atomizing gas is used, the liquid can be supplied at ambient pressure.

Furthermore, the spray drying apparatus is supplied with a drying gas such as air or one of the inert gases mentioned. The drying gas can be supplied in cocurrent or countercurrent to the sprayed liquid, preferably in cocurrent. The inlet temperature of the drying gas can be 120 to 300° C., preferably 150 to 230° C., the outlet temperature 60 to 135° C.

As already mentioned, the magnitudes of the spraying parameters to be used, such as throughput, gas pressure or nozzle diameter, depend decisively on the size of the apparatuses. The apparatuses are commercially available and appropriate magnitudes are usually recommended by the manufacturer.

According to the invention, the spraying process is preferably performed such that the average droplet size of the sprayed phases is 5 to 2000 μm, preferably 5 to 500 μm, particularly preferably 5 to 200 μm. The average droplet size can be ascertained by means of laser diffraction or high-speed cameras coupled with image evaluation. The statements above with respect to the spraying process can be applied to all preferred and particularly preferred embodiments described hereinafter. Preferred spraying parameters are also preferred in association with the embodiments hereafter.

Preference is given to a process, wherein the polymeric dispersant (PD) is a polymer, preferably a copolymer, that was obtained by means of polymerization, preferably free-radical polymerization of ethylenically unsaturated monomers, of at least one monomer having at least one anionic and/or at least one anionogenic group and of at least one monomer comprising at least one polyether side chain.

The anionic group is preferably selected from carboxylate, phosphonate or phosphate, particularly preferably carboxylate and/or phosphate, it being possible for one or more of the anionic groups carboxylate, phosphonate, phosphate to be present in the dispersant (PD).

The anionogenic group is preferably selected from carboxylic esters, phosphonic esters or phosphoric esters, particularly preferably carboxylic esters and/or phosphoric esters, it being possible for one or more of the ester groups carboxylic ester, phosphonic ester or phosphoric ester to be present in the dispersant (PD). It is also possible for anionic and anionogenic groups to be present in the polymeric dispersant (PD), for example from the copolymerization of anionic monomers and anionogenic monomers.

An example of a structural unit having more than one anionic group that could be mentioned would be the salt of maleic acid in copolymerized form, and an example of a monomer comprising an anionic and an anionogenic group that could be cited would be the hydrolyzable monoesters of maleic acid. Monomer units comprising two anionogenic groups would for example be hydrolyzable diesters of maleic acid.

The dispersants (PD) used in the process according to the invention are polymers, preferably copolymers, and have structural units having anionic and/or anionogenic groups and also structural units having polyether side chains. Dispersants which are copolymers and originate from a free-radical polymerization of ethylenically unsaturated monomers are preferably used in the process, with, firstly, monomers having structural units comprising anionic and/or anionogenic groups being used and, secondly, monomers having structural units comprising polyether side chains.

It is likewise possible to use copolymers from polycondensation reactions which have structural units having anionic and/or anionogenic groups and structural units having polyether side chains, for example polycondensates of aromatic compounds with (form)aldehyde. In particular, the aromatic monomers used alongside aldehydes, preferably formaldehyde, here comprise firstly a polyether side chain (e.g. alkoxylated phenol) and secondly a phosphate group (e.g. phenoxyethanol phosphate). Such polycondensates have been described for example in the international patent application WO 2006/042709 A1.

The anionic groups are to be understood to mean in this invention preferably carboxylates, phosphonates or phosphates, where the polymeric dispersants (PD) can comprise just one of the three anionic groups or else two or more. Carboxylates and/or phosphates are particularly preferred as anionic groups. The term "anionogenic groups" is preferably to be understood to mean chemical groups which by way of a chemical reaction, preferably by way of a hydrolysis reaction, release carboxylates, phosphonates or phosphates, for example by way of a hydrolysis reaction of corresponding esters of carboxylic acids, phosphonic acids or phosphoric acid, likewise by way of a hydrolysis reaction of corresponding acid anhydrides, such as for example maleic anhydride in copolymerized form. The anionogenic group is preferably a carboxylic anhydride or a carboxylic ester which after appropriate hydrolysis reaction results in a structure comprising at least one carboxylate group.

Preference is given to a process wherein the polymeric dispersant (PD) has at least one structural unit of general formulae (Ia), (Ib), (Ic) or (Id):

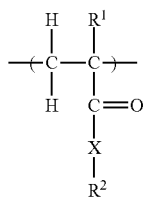

(Ia)

in which
$R^1$ is H or an unbranched or branched $C_1$-$C_4$-alkyl group, $CH_2COOH$ or $CH_2CO$—X—$R^3$;
X is NH—$(C_nH_{2n})$ or O—$(C_nH_{2n})$ with n=1, 2, 3 or 4 or is a chemical bond, wherein the nitrogen atom or the oxygen atom is bonded to the CO group;
$R^2$ is OM, $PO_3M_2$ or O—$PO_3M_2$; with the proviso that X is a chemical bond when $R^2$ is OM;
$R^3$ is $PO_3M_2$ or O—$PO_3M_2$;

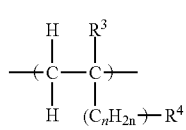

(Ib)

in which
$R^3$ is H or an unbranched or branched $C_1$-$C_4$-alkyl group;
n is 0, 1, 2, 3 or 4;
$R^4$ is $PO_3M_2$ or O—$PO_3M_2$;

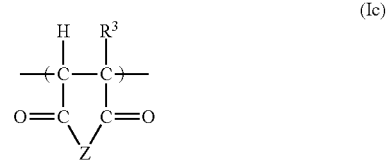

(Ic)

in which
$R^5$ is H or an unbranched or branched $C_1$-$C_4$-alkyl group;
Z is O or $NR^7$; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$ $OPO_3M_2$,
n is 1, 2, 3 or 4;

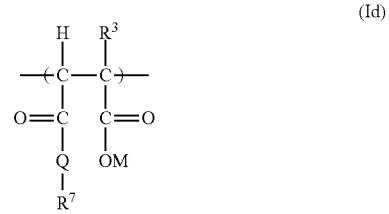

(Id)

in which
$R^6$ is H or an unbranched or branched $C_1$-$C_4$-alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$ or $(C_6H_4)$ $OPO_3M_2$,
n is 1, 2, 3 or 4; and
where each M is independently H or one cation equivalent.

The term "cation equivalent" in this patent application preferably means any type of cation (with the exception of the hydronium ion), wherein the cation is indicated without its charge and is divided by its charge number. The nature of the cation is not particularly limited, except for the hydronium ion.

Preference is given to alkali metal cations, (alkyl)ammonium cations, alkanolammonium cations, ½ alkaline earth metal cations, ⅓ Al, transition metal cations having a charge number of 2 or 3, preferably ⅓ Fe, ½ Fe or ½ Zn. For example, in the case of alkali metal cations, the cation equivalent means Li, Na or K, as the charge number is 1. For alkaline earth metal cations having a charge of 2, for example, ½ Mg, ½ Ca, ½ Ba and so on results, for triply charged cations such as for example $Al^{3+}$ or $Fe^{3+}$, ⅓ Al or ⅓ Fe accordingly results.

M is particularly preferably selected from the group of H, Li, Na, K, ½ Mg, ½ Ca, ½ Ba, ½ Zn, ⅓ Al, ½ Fe or ⅓ Fe.

Preference is given to a process wherein the polymeric dispersant (PD) has at least one structural unit of general formulae (IIa), (IIb), (IIc) or (IId):

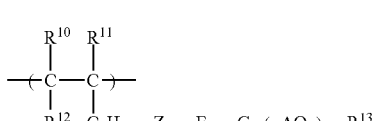

(IIa)

in which
$R^{10}$, $R^{11}$ and $R^{12}$ are each independently H or an unbranched or branched $C_1$-$C_4$-alkyl group;
Z is O or S;
E is an unbranched or branched $C_1$-$C_6$-alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5 or $CH_2CH(C_6H_5)$;
n is 0, 1, 2, 3, 4 and/or 5;
a is an integer from 2 to 350;
$R^{13}$ is H, an unbranched or branched $C_1$-$C_4$-alkyl group, CO—$NH_2$ and/or $COCH_3$;

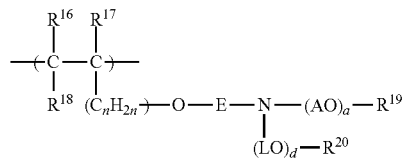
(IIb)

in which
$R^{16}$, $R^{17}$ and $R^{18}$ are each independently H or an unbranched or branched $C_1$-$C_4$-alkyl group;
E is an unbranched or branched $C_1$-$C_6$-alkylene group, a cyclohexylene group, $CH_2$—$C_6H_{10}$, 1,2-phenylene, 1,3-phenylene or 1,4-phenylene, or is a chemical bond;
A is $C_xH_{2x}$ with x=2, 3, 4 or 5 or $CH_2CH(C_6H_5)$;
L is $C_xH_{2x}$ with x=2, 3, 4 or 5 or $CH_2$—$CH(C_6H_5)$;
a is an integer from 2 to 350;
d is an integer from 1 to 350;
$R^{19}$ is H or an unbranched or branched $C_1$-$C_4$-alkyl group;
$R^{20}$ is H or an unbranched or branched $C_1$-$C_4$-alkyl group; and
n is 0, 1, 2, 3, 4 or 5;

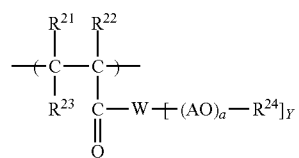
(IIc)

in which
$R^{21}$, $R^{22}$ and $R^{23}$ are each independently H or an unbranched or branched $C_1$-$C_4$-alkyl group;
W is O, $NR^{25}$, N
Y is 1 when W=O or $NR^{25}$, and is 2 when W=N;
A is $C_xH_{2x}$ with x=2, 3, 4 or 5 or $CH_2CH(C_6H_5)$;
a is an integer from 2 to 350;
$R^{24}$ is H or an unbranched or branched $C_1$-$C_4$-alkyl group;
$R^{25}$ is H or an unbranched or branched $C_1$-$C_4$-alkyl group;

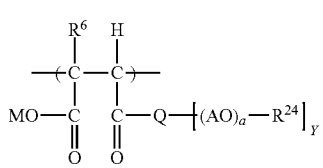
(IId)

in which
$R^6$ is H or an unbranched or branched $C_1$-$C_4$-alkyl group;
Q is $NR^{10}$, N or O;
Y is 1 when Q=O or $NR^{10}$, and is 2 when Q=N;
$R^{10}$ is H or an unbranched or branched $C_1$-$C_4$-alkyl group;
A is $C_xH_{2x}$ with x=2, 3, 4 or 5, or $CH_2C(C_6H_5)H$;
$R^{24}$ is H or an unbranched or branched $C_1$-$C_4$-alkyl group;
M is H or one cation equivalent; and
a is an integer from 2 to 350.

Preference is given to a process wherein the polymeric dispersant (PD) comprises at least one polymer which is a polycondensation product comprising structural units (III) and (IV):

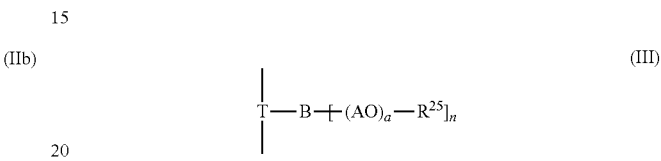
(III)

in which
T is a substituted or unsubstituted phenyl radical, a substituted or unsubstituted naphthyl radical or a substituted or unsubstituted heteroaromatic radical having to 10 ring atoms, of which 1 or 2 atoms are heteroatoms selected from N, O and S;
n is 1 or 2;
B is N, NH or O, with the proviso that n is 2 when B is N and the proviso that n is 1 when B is NH or O;
A is $C_xH_{2x}$ with x=2, 3, 4 or 5 or $CH_2CH(C_6H_5)$;
a is an integer from 1 to 300;
$R^{25}$ is H, a branched or unbranched $C_1$- to $C_{10}$-alkyl radical, $C_5$- to $C_8$-cycloalkyl radical, aryl radical or heteroaryl radical having 5 to 10 ring atoms, of which 1 or 2 atoms are heteroatoms selected from N, O and S;
where the structural unit (IV) is selected from the structural units (IVa) and (IVb):

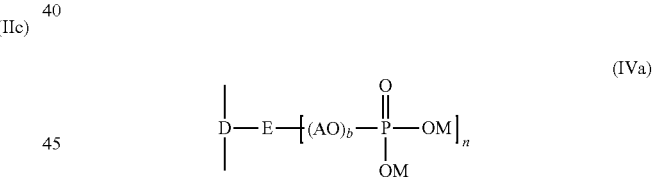
(IVa)

in which
D is a substituted or unsubstituted phenyl radical, a substituted or unsubstituted naphthyl radical or a substituted or unsubstituted heteroaromatic radical having to 10 ring atoms, of which 1 or 2 atoms are heteroatoms selected from N, O and S;
E is N, NH or O, with the proviso that m is 2 when E is N and the proviso that m is 1 when E is NH or O;
A is $C_xH_{2x}$ with x=2, 3, 4 or 5 or $CH_2CH(C_6H_5)$;
b is an integer from 1 to 300;
M is independently H or one cation equivalent;

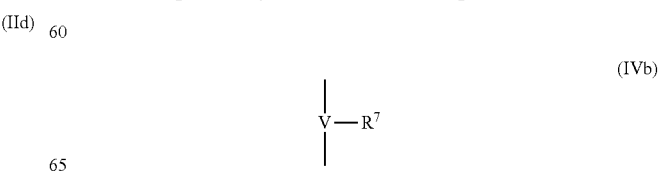
(IVb)

in which
V is a substituted or unsubstituted phenyl radical or a substituted or unsubstituted naphthyl radical;
$R^7$ is COOM, $OCH_2COOM$, $SO_3M$ or $OPO_3M_2$;
M is H or one cation equivalent;
where the phenyl, naphthyl or heteroaromatic radicals mentioned are optionally substituted by 1 or two radicals selected from $R^8$, OH, $OR^8$, $(CO)R^8$, COOM, $COOR^8$, $SO_3R^8$ and $NO_2$; and
and
$R^8$ is $C_1$-$C_4$-alkyl, phenyl, naphthyl, phenyl-$C_1$-$C_4$-alkyl or $C_1$-$C_4$-alkylphenyl.

Preference is given to a process wherein the charge density of the polymeric dispersant (PD) is from 1.65 mEq/g to 10.0 mEq/g, the charge density of the polymeric dispersant (PD) is preferably from 2.0 mEq/g to 4.0 mEq/g.

An excessively low charge density of the polymeric dispersant (PD) is less effective because the viscosity of the dispersion of the polysaccharide (PD) cannot be reduced as effectively. High charge densities result in an excessively rapid loss of the dispersing efficiency in the application and also excessive retardation of the inorganic binders.

Preference is given to a process wherein in process step a) the aqueous dispersion is produced by initially charging an aqueous solution of the polymeric dispersant (PD) which comprises more than 70%, preferably more than 80%, especially preferably more than 90%, of the polymeric dispersant (PD) used, and adding the polysaccharide (PS) to the aqueous solution of the polymeric dispersant (PD). The polysaccharide (PS) can be added in solid or dissolved form or else in swollen form; it is preferably added in solid form. It is advantageous to add the polysaccharide (PS) in solid form, since the viscosity decreases more rapidly and in addition the polysaccharide is easier to dose in the form of a solid for practical reasons. The remaining (difference from 100%) polymeric dispersant (PD) can be added in any desired manner, for example at the end of addition of the polysaccharide (PS) or else in parallel with the addition of the polysaccharide (PS).

It has been found that it is advantageous if there is an excess of polymeric dispersant (PD) with respect to the polysaccharide (PS) at the start of the process, since in this way in step a) dispersions having particularly low viscosity can be obtained. It is most preferable for 95% to 100%, particularly preferably 100%, of the polymeric dispersant (PD) used to be initially charged and subsequently to add the polysaccharide (PS).

Preference is given to a process wherein in process step a) the aqueous dispersion is produced by initially charging an aqueous solution of the polymeric dispersant (PD) which comprises more than 70%, preferably more than 80%, especially preferably more than 90%, of the polymeric dispersant (PD) used, and adding the polysaccharide (PS) to the aqueous solution of the polymeric dispersant (PD), preference being given to adding the polysaccharide (PS) a little at a time. The term "addition a little at a time" preferably means that less than 50% of the polysaccharide (PS) is added all at once, particularly preferably that less than 30% of the polysaccharide (PS) is added all at once. The term "addition a little at a time" particularly preferably means that the polysaccharide (PS) is added over a period of at least 5 minutes, particularly preferably 5 to 15 minutes.

Preference is given to a process wherein in process step a) the aqueous dispersion is produced by initially charging an aqueous solution of the polymeric dispersant (PD) which comprises more than 70%, preferably more than 80%, especially preferably more than 90%, of the polymeric dispersant (PD) used, and adding the polysaccharide (PS) to the aqueous solution of the polymeric dispersant (PD), preference being given to adding the polysaccharide (PS) while stirring the initially charged dispersion, particularly preferably a little at a time and while stirring the initially charged dispersion.

A dispersion having a viscosity of the dispersion of less than 10 000 mPa·s is present in process step a). This comprises the at least one polymeric dispersant (PD) and the at least one polysaccharide (PS).

Preference is given to a process wherein the polysaccharide (PS) a) is a cellulose ether and is selected from the group of alkyl celluloses, hydroxyalkyl celluloses or alkyl hydroxyalkyl celluloses or b) is a nonionic starch ether, c) is a microbiologically produced polysaccharide, d) is a naturally occurring polysaccharide, preferably naturally occurring and of vegetable origin, or e) is a polysaccharide obtained from fungus cultures, one or more of the polysaccharides mentioned above under a) to e) being used in each case. An example which can be mentioned of polysaccharides (PS) produced via fungus cultures is schizophyllan. One or more of the aforementioned types a) to e) of polysaccharides, as well as two or more representatives of these types, can be used.

The c) microbiologically produced polysaccharide is preferred over the a) cellulose ethers and over the b) nonionic starch ethers. Preference is given to selecting the c) microbiologically produced polysaccharide selected from the group of welan gum, xanthan gum or diutan gum, it being possible for the respective polysaccharides to be used individually or in mixtures.

Preference as polysaccharide (PS) is given to diutan gum and/or xanthan gum; diutan gum is especially preferred.

Preference is given to a process wherein the weight ratio of polymeric dispersant (PD) to polysaccharide (PS) is from 10/1 to 50/1.

Preference is given to a process wherein the water content in the aqueous dispersion of polymeric dispersant (PD) and polysaccharide (PS) from step a) is greater than 35% by weight and is less than 65% by weight.

Preference is given to a process wherein in the aqueous dispersion of polymeric dispersant (PD) and polysaccharide (PS) of step a) the sum total of the parts by weight of PD and PS, based on the weight of the overall aqueous dispersion, is at least 30% by weight, preferably at least 35% by weight.

Preference is given to a process wherein the aqueous dispersion of step a), comprising the polymeric dispersant(s) (PD) and the polysaccharide(s), comprises less than 5% by weight of inorganic substances having a surface charge of greater than 4 $e^-/nm^2$.

Preference is given to a process wherein the aqueous dispersion of step a), comprising the polymeric dispersant(s) (PD) and the polysaccharide(s), comprises less than 5% by weight of calcium silicate hydrate.

The invention also relates to pulverulent compositions obtained from one of the processes according to the invention.

The invention also relates to building material compositions comprising the pulverulent compositions obtained from the process according to the invention and inorganic binders selected from the group of cement, calcium sulfate hemihydrate, anhydrite, slag sand, fly ash, silica dust, metakaolin, natural pozzolans, burnt oil shale, calcium aluminate cement or calcium sulfoaluminate cement, one or more of the binders mentioned being present in the building material mixtures.

The invention also relates to the use of the pulverulent compositions according to the invention as a rheological additive, preferably for preventing segregation, for building material mixtures comprising cement, calcium sulfate hemihydrate, anhydrite, slag sand, fly ash, silica dust, metakaolin, natural pozzolans, burnt oil shale, calcium aluminate cement or calcium sulfoaluminate cement, one or more of the binders mentioned being present in the building material mixtures.

The building material mixtures are preferably free-flowing spackling compounds or self-leveling screeds. The advantage of the pulverulent compositions according to the invention is that segregation (so-called bleeding of the building material mixture) can be avoided in particular in free-flowing systems, such as for example free-flowing spackling compounds and self-leveling screeds.

The preferred dosage of the pulverulent compositions according to the invention is 0.05% by weight, based on the binder, preferably on cement.

Preference is given to building material mixtures which comprise cement as the hydraulic binder or comprise more than 10% by weight of cement.

The invention also relates to the use of the pulverulent compositions according to the invention for the production of dry mortar mixtures in order to prevent separation of the polymeric dispersant (PD) and of the polysaccharide (PS) in the dry mortar.

EXAMPLES

PCE 1: A comb polymer made from ethoxylated hydroxybutyl vinyl ether (3000 g/mol) and acrylic acid in the ratio 10/1. Charge density 2.688 meq/g.

PCE 2: A comb polymer made from ethoxylated hydroxybutyl vinyl ether (3000 g/mol) and acrylic acid in the ratio 5/1. Charge density 1.488 meq/g.

PCE 3: A comb polymer made from ethoxylated hydroxybutyl vinyl ether (3000 g/mol) and acrylic acid in the ratio 2/1. Charge density 0.636 meq/g.

Polymer 4: Polymer prepared according to WO15091461 A1, table 1 example 7.

For example 1, into a 50% by weight solution of PCE 1 was stirred 10% by weight of a powder of Kelco-Crete DG-F (diutan gum, available from CP Kelco), based on the solids in the PCE 1 solution. The resulting suspension (formulation A) was subsequently spray dried using a two-fluid nozzle in a GEA Mobile Minor MM-I TYPE (inlet temperature 220° C., outlet temperature 98° C.). The viscosities were measured using a Brookfield viscometer (LV1 spindle) at 20° C.

TABLE 1

|  | Viscosity (20° C.) |
| --- | --- |
| PCE 1 (50% by weight) | 230 mPa · s |
| Kelco-Crete DG-F (10% by weight) | >10 000 mPa · s |
| Formulation A | 232 mPa · s |

The resulting powder was tested in accordance with DIN EN 12706 in a mortar formulation of a ternary self-leveling composition (see table 2) against a physical mixture of the components PCE 2 and Kelco-Crete DG-F (comparative example 1). The water/binder ratio was w/b=0.6. The two powder composites (physical mixing and co-drying) were placed in a plastic bottle on a vibrating table for 24 h. A sample from the top and a sample from the bottom via punched openings in the bottle were subsequently taken from both using a spatula and tested against each other. The results of the slump after 8 min and the flow time of the DIN No. 4 Ford cups are shown in table 3.

TABLE 2

|  | Proportions by mass |
| --- | --- |
| Portland cement (Milke CEM I 52.5 N) | 18.5 |
| Alumina cement (Kerneos Fondu) | 11.5 |
| CaSO4 (CAB 30) calcium sulfate binder | 6.5 |
| H33 silica sand | 41.43 |
| Ground limestone (Omyacarb 15 AL) | 19.4 |
| Redispersion powder (Vinnapas 5023 L) | 2 |
| Lithium carbonate | 0.1 |
| Vinapor DF 9010 | 0.1 |
| BCK tartaric acid | 0.03 |
| Powder composite | 0.34 |

TABLE 3

|  |  | Slump after 8 min in cm | Flow time |
| --- | --- | --- | --- |
| Without shaking | Example 1 (inventive) | 15.9 | 68 sec |
|  | Physical mixture (comparative example 1) | 15.7 | 63 sec |
| After 24 h on the vibrating plate | Example 1: Sample from the top | 15.9 | 67 sec |
|  | Example 1: Sample from the bottom | 15.8 | 68 sec |
|  | Comparative example 1 Physical mixture: top | 16.3 | 59 sec |
|  | Comparative example 1 Physical mixture: bottom | 12.8 | Not determinable |

In order the broad applicability, further liquid mixtures were produced and when possible powder samples were produced from these by means of spray drying. The preparation was effected analogously to Example 1. The liquid samples were each adjusted to a solids content of 50% by weight.

TABLE 4

| Experiment | Dispersant | Thickener | Viscosity (mPa · s) |
| --- | --- | --- | --- |
| 1* | PCE 2 (10% by weight) ** | Kelco-Crete DG-F (90% by weight) | >10000 |
| 2* | PCE 2 (20% by weight) | Kelco-Crete DG-F (80% by weight) | >10000 |
| 3 | PCE 2 (50% by weight) | Kelco-Crete DG-F (50% by weight) | 500 |
| 4 | PCE 2 (75% by weight) | Kelco-Crete DG-F (25% by weight) | 250 |
| 5 | PCE 2 (98% by weight) | Kelco-Crete DG-F (2% by weight) | 180 |
| 6 | PCE 2 (90% by weight) | Kelco-Crete DG-F (10% by weight) | 230 |
| 7 | PCE 1 (90% by weight) | Kelco-Crete DG-F (10% by weight) | 210 |
| 8 | Polymer 4 (90% by by weight) | Kelco-Crete DG-F (10% by weight) | 160 |
| 9 | PCE 2 (90% by weight) | Culminal C-4053 (10% by weight) | 190 |
| 10 | PCE 2 (90% by weight) | Walocel MKX 6000 (10% by weight) | 180 |
| 11* | PEG 1000 (90% by by weight) | Kelco-Crete DG-F (10% by weight) | >10000 |
| 12* | PCE 2 (90% by weight) | Starvis (polyacrylamide) (10% by weight) | >10000 |

*comparative examples
** The % by weight figures in the table relate to the solids in the liquid samples Culminal C-4053 is a methyl cellulose available from Ashland Walocel MKX 6000 is a methyl hydro)wropyl cellulose available from DOW.

All dried samples were shaken on a vibrating table for 24 hours and then the composition and sedimentation stability thereof were measured by means of Raman spectroscopy. The signals at 1475 cm$^{-1}$ and 1280 cm$^{-1}$ were used and integrated as signals for the polyethers. A local accumulation of a component could not be observed in any of the samples.

The powders of experiments 4, 5, 8 and 9 were tested in a ternary formulation according to table 2 as in example 1. The dosage was adapted correspondingly to an identical plasticizer content.

TABLE 5

|  | Slump | Flow time |
| --- | --- | --- |
| Experiment 4 | 15.3 cm | 63 sec |
| Experiment 5 | 15.2 cm | 58 sec |
| Experiment 9 | 14.9 cm | 67 sec |

The powder from experiment 8, table 4 was also examined in a ternary formulation according to table 2. Due to the relatively low metering efficiency of polymer 4 in this application, the dosage of the powder composite was raised to 0.46 proportions by mass. The co-dried polymer was compared with the physical mixture.

TABLE 6

|  |  | Slump after 8 min in cm | Flow time |
| --- | --- | --- | --- |
| Without shaking | Example 8 (inventive) | 15.3 | 61 sec |
|  | Physical mixture (comparative example 8) | 15.9 | 65 sec |
| After 24 h on the vibrating plate | Example 8: Sample from the top | 15.9 | 62 sec |
|  | Example 8: Sample from the bottom | 15.2 | 63 sec |
|  | Comparative example 8 physical mixture: top | 16.3 | 59 sec |
|  | Comparative example 8 physical mixture: bottom | 12.4 | Not determinable |

The invention claimed is:

1. A process for producing a pulverulent composition comprising at least one polymeric dispersant (PD) which comprises at least one structural unit comprising anionic groups and/or at least one structural unit comprising anionogenic groups and also at least one structural unit having polyether side chains, and at least one polysaccharide (PS), wherein the weight ratio of polymeric dispersant (PD) to polysaccharide (PS) is from 1/1 to 50/1 and the pulverulent composition comprises at least 65% by weight of the polymeric dispersant and the following process steps are performed:
   a) production of an aqueous dispersion having a viscosity of the dispersion of less than 10 000 mPa·s, comprising the at least one polymeric dispersant (PD) and the at least one polysaccharide (PS),
   b) spray drying of the aqueous dispersion produced in process step a).

2. The process according to claim 1, wherein the polymeric dispersant (PD) is a polymer that was obtained by means of polymerization of at least one monomer having at least one anionic and/or at least one anionogenic group and of at least one monomer comprising at least one polyether side chain.

3. The process according to claim 2, wherein the polymeric dispersant (PD) has at least one structural unit of general formulae (Ia), (Ib), (Ic) or (Id):

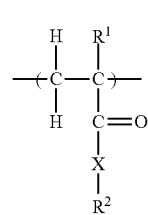

(Ia)

in which
R$^1$ is H or an unbranched or branched C$_1$-C$_4$-alkyl group, CH$_2$COOH or CH$_2$CO—X—R$^3$;
X is NH—(C$_n$H$_{2n}$) or O—(C$_n$H$_{2n}$) with n=1, 2, 3 or 4 or is a chemical bond, wherein the nitrogen atom or the oxygen atom is bonded to the CO group;
R$^2$ is OM, PO$_3$M$_2$ or O—PO$_3$M$_2$, with the proviso that X is a chemical bond when R$^2$ is OM;
R$^3$ is PO$_3$M$_2$ or O—PO$_3$M$_2$;

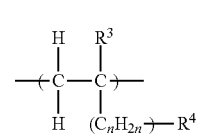

(Ib)

in which
R$^3$ is H or an unbranched or branched C$_1$-C$_4$-alkyl group;
n is 0, 1, 2, 3 or 4;
R$^4$ is PO$_3$M$_2$ or O—PO$_3$M$_2$;

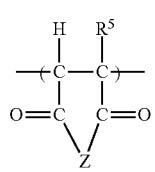

(Ic)

in which
R$^5$ is H or an unbranched or branched C$_1$-C$_4$-alkyl group;
Z is O or NR$^7$; and
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$m$_2$ or (C$_6$H$_4$)OPO$_3$M$_2$,
n is 1, 2, 3 or 4;

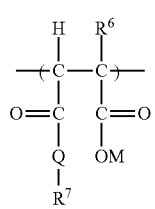

(Id)

in which
R$^6$ is H or an unbranched or branched C$_1$-C$_4$-alkyl group;
Q is NR$^7$ or O;
R$^7$ is H, (C$_n$H$_{2n}$)—OH, (C$_n$H$_{2n}$)—PO$_3$M$_2$, (C$_2$H$_{2n}$)—OPO$_3$M$_2$, (C$_6$H$_4$)—PO$_3$M$_2$ or (C$_6$H$_4$)—OPO$_3$M$_2$,
n is 1, 2, 3 or 4; and
where each M is independently H or one cation equivalent.

4. The process according to claim 1, wherein the polymeric dispersant (PD) has at least one structural unit of general formulae (IIa), (IIb), (IIc) or (IId):

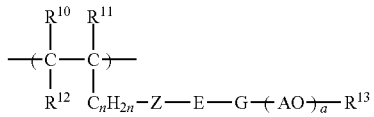
(IIa)

in which
$R^{10}$, $R^{11}$ and $R^{12}$ are each independently H or an unbranched or branched $C_1$-$C_4$-alkyl group;
Z is O or S;
E is an unbranched or branched $C_1$-$C_6$-alkylene group, a cyclohexylene group, $CH_2$-$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5 or $CH_2CH(C_6H_5)$;
n is 0, 1, 2, 3, 4 and/or 5;
a is an integer from 2 to 350;
$R^{13}$ is H, an unbranched or branched $C_1$-$C_4$-alkyl group, CO—$NH_2$ and/or $COCH_3$;

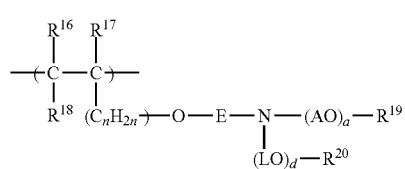
(IIb)

in which
$R^{16}$, $R^{17}$ and $R^{18}$ are each independently H or an unbranched or branched $C_1$-$C_4$-alkyl group;
E is an unbranched or branched $C_1$-$C_6$-alkylene group, a cyclohexylene group, $CH_2$-$C_6H_{10}$, 1,2-phenylene, 1,3-phenylene or 1,4-phenylene, or is a chemical bond;
A is $C_xH_{2x}$ with x=2, 3, 4 or 5 or $CH_2CH(C_6H_5)$;
L is $C_xH_{2x}$ with x=2, 3, 4 or 5 or $CH_2$—$CH(C_6H_5)$;
a is an integer from 2 to 350;
d is an integer from 1 to 350;
$R^{19}$ is H or an unbranched or branched $C_1$-$C_4$-alkyl group;
$R^{20}$ is H or an unbranched or branched $C_1$-$C_4$-alkyl group; and
n is 0, 1, 2, 3, 4 or 5;

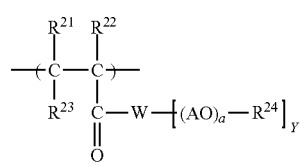
(IIc)

in which $R^{21}$, $R^{22}$ and $R^{23}$ are each independently H or an unbranched or branched $C_1$-$C_4$-alkyl group;
W is O, $NR^{25}$, N
Y is 1 when W=O or $NR^{25}$, and is 2 when W=N;
A is $C_xH_{2x}$ with x=2, 3, 4 or 5 or $CH_2CH(C_6H_5)$;
a is an integer from 2 to 350;
$R^{24}$ is H or an unbranched or branched $C_1$-$C_4$-alkyl group;
$R^{25}$ is H or an unbranched or branched $C_1$-$C_4$-alkyl group;

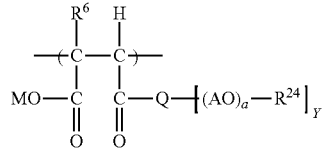
(IId)

in which
$R^6$ is H or an unbranched or branched $C_1$-$C_4$-alkyl group;
Q is $NR^{10}$, N or O;
Y is 1 when Q=O or NR10, and is 2 when Q=N;
R10 is H or an unbranched or branched $C_1$-$C_4$-alkyl group;
A is CxH2x with x=2, 3, 4 or 5, or CH2C(C6H5)H;
R24 is H or an unbranched or branched C1-C4-alkyl group;
M is H or one cation equivalent; and
a is an integer from 2 to 350.

5. The process according to claim 2, wherein the polymeric dispersant (PD) comprises at least one polymer which is a polycondensation product comprising structural units (III) and (IV):

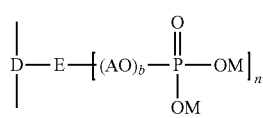
(III)

in which
T is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O with the proviso that n is 2 when B is N and the proviso that n is 1 when B is NH or O;
A is $C_xH_{2x}$ with x=2, 3, 4 or 5 or $CH_2CH(C_6H_5)$;
a is an integer from 1 to 300;
$R^{25}$ is H, a branched or unbranched $C_1$- to $C_{10}$-alkyl radical, $C_5$- to $C_8$-cycloalkyl radical, aryl radical or heteroaryl radical having 5 to 10 ring atoms, of which 1 or 2 atoms are heteroatoms selected from N, O and S;
where the structural unit (IV) is selected from the structural units (IVa) and (IVb):

(IVa)

in which
D is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O and S;
E is N, NH or O with the proviso that m is 2 when E is N and the proviso that m is 1 when E is NH or O;

A is $C_xH_{2x}$ with x=2, 3, 4 or 5 or $CH_2CH(C_6H_5)$;
b is an integer from 1 to 300;
M is independently H or one cation equivalent;

 (IVb)

in which
V is a substituted or unsubstituted phenyl radical or a substituted or unsubstituted naphthyl radical;
$R^7$ is COOM, $OCH_2COOM$, $SO_3M$ or $OPO_3M_2$;
M is H or one cation equivalent;
where the phenyl, naphthyl or heteroaromatic radicals mentioned are optionally substituted by 1 or two radicals selected from $R^8$, OH, $OR^8$, $(CO)R^8$, COOM, $COOR^8$, $SO_3R^8$ and $NO_2$; and
$R^8$ is $C_1$-$C_4$-alkyl, phenyl, naphthyl, phenyl-$C_1$-$C_4$-alkyl or $C_1$-$C_4$-alkylphenyl.

6. The process according to claim 1, wherein the charge density of the at least one polymeric dispersant (PD) is from 1.65 mEq/g to 10.0 mEq/g.

7. The process according to claim 1, wherein the polysaccharide (PS) a) is a cellulose ether and is selected from the group of alkyl celluloses, hydroxyalkyl celluloses or alkyl hydroxyalkyl celluloses or b) is a nonionic starch ether, or c) is a microbiologically produced polysaccharide, one or more of the abovementioned polysaccharides being used in each case.

8. The process according to claim 1, wherein the water content in the aqueous dispersion of polymeric dispersant (PD) and polysaccharide (PS) from step a) is greater than 35% by weight and is less than 65% by weight.

9. The process according to claim 1, wherein the aqueous dispersion of step a), comprising the polymeric dispersant(s) (PD) and the polysaccharide(s), comprises less than 5% by weight of calcium silicate hydrate.

10. The process according to claim 1, wherein the weight ratio of polymeric dispersant (PD) to polysaccharide (PS) is from 2/1 to 50/1 and the pulverulent composition consists of at least 65% by weight of the polymeric dispersant.

11. A pulverulent composition obtained from the process according to claim 1.

12. A building material composition comprising the pulverulent composition according to claim 11 and at least one inorganic binder selected from the group of cement, calcium sulfate hemihydrate, anhydrite, slag sand, fly ash, silica dust, metakaolin, natural pozzolans, burnt oil shale, calcium aluminate cement or calcium sulfoaluminate cement.

13. A rheological additive for building material mixtures comprising one or more binders selected from the group consisting of cement, calcium sulfate hemihydrate, anhydrite, slag sand, fly ash, silica dust, metakaolin, natural pozzolans, burnt oil shale, calcium aluminate cement or calcium sulfoaluminate cement, wherein one or more of said binders comprises the pulverulent composition according to claim 11.

14. A process for the production of dry mortar mixtures in order to prevent separation of the polymeric dispersant (PD) and of the polysaccharide (PS) in the dry mortar which comprises: physically mixing a binder with the pulverulent composition of claim 11.

15. A process for producing a pulverulent composition comprising at least one polymeric dispersant (PD) which comprises at least one structural unit comprising anionic groups and/or at least one structural unit comprising anionogenic groups and also at least one structural unit having polyether side chains, and at least one polysaccharide (PS), wherein the weight ratio of polymeric dispersant (PD) to polysaccharide (PS) is from 1/1 to 50/1 nd the following process steps are performed:
a) production of an aqueous dispersion having a viscosity of the dispersion of less than 10 000 mPa·s, comprising the at least one polymeric dispersant (PD) and the at least one polysaccharide (PS),
b) spray drying of the aqueous dispersion produced in process step a) and
wherein in process step a) the aqueous dispersion is produced by initially charging an aqueous solution of the at least one polymeric dispersant (PD) which comprises more than 70% of the at least one polymeric dispersant (PD) used, and adding the at least one polysaccharide (PS) to the aqueous solution of the at least one polymeric dispersant (PD).

16. The process according to claim 15, wherein in process step a) the aqueous dispersion is produced by initially charging an aqueous solution of the at least one polymeric dispersant (PD) which comprises more than 80% of the at least one polymeric dispersant (PD) used, and adding the at least one polysaccharide (PS) in solid form to the aqueous solution of the at least one polymeric dispersant (PD).

* * * * *